United States Patent [19]

Kobayashi et al.

[11] Patent Number: 4,766,495

[45] Date of Patent: Aug. 23, 1988

[54] PHASE ERROR CORRECTING APPARATUS

[75] Inventors: Yuji Kobayashi; Tsutomu Takamori, both of Kanagawa, Japan

[73] Assignee: Sony Corporation, Tokyo, Japan

[21] Appl. No.: 948,076

[22] Filed: Dec. 31, 1986

[30] Foreign Application Priority Data

Jan. 21, 1986 [JP] Japan .................................. 61-11357

[51] Int. Cl.[4] .............................................. H04N 5/04
[52] U.S. Cl. .................................... 358/148; 358/149; 358/160
[58] Field of Search ............... 358/337, 339, 320, 148, 358/149, 13, 160

[56] References Cited

FOREIGN PATENT DOCUMENTS 2090104 6/1982 United Kingdom ................ 358/320

Primary Examiner—James J. Groody
Assistant Examiner—David E. Harvey
Attorney, Agent, or Firm—Lewis H. Eslinger; Donald S. Dowden

[57] ABSTRACT

In a phase error correcting apparatus for correcting the phase of an input sampled signal having discrete digital data at a predetermined sampling period by means of a phase error signal, an interpolating calculation is made therein using digital data of the input sampled signal so that digital data of a corrected output sampled signal at the sampling points can thereby be obtained, and thus, the output sampled signal is obtained in which corrected sampled digital data are produced at the same sampling time points at the predetermined sampling period.

3 Claims, 8 Drawing Sheets

PHASE ERROR CORRECTING APPARATUS

BACKGROUND OF THE INVENTION

1. Field of the Invention

The present invention relates to an apparatus for correcting a phase error in a sampling signal suited for use in such process as velocity error correction, sampling phase control, and hue control for a video signal constituted as a digital signal, for example, in a video tape recorder (VTR).

2. Description of the Prior Art

There has so far been known a system as shown in FIG. 1, for example, used as a velocity error correcting circuit in a VTR, in which a read phase of a reproduced video sampling signal stored in a main memory 1 is phase modulated by a phase error signal SVE formed of a velocity error signal, whereby a time base correction is given to the velocity error included in a reproduced video signal VDIN. The method for correcting velocity error by means of phase modulation is disclosed in the Japanese magazine "Broadcasting Technology", August, 1975, pages 571-578.

Referring to FIG. 1, a reproduced video signal VDIN is converted into, for example, 910 samples of digital data for each H period in an analog to digital converting circuit 2 according to a sampling signal SSM1 supplied from a write clock generating circuit 3, and the sampled digital data DSM are successively written in a main memory 1 as a write clock pulse PWT generated by the write clock generating circuit 3 is supplied through a sequencer 4 to the main memory 1.

These data written in the main memory 1 are read out according to a read clock pulse PRD generated by a read clock generating circuit 6 through a drop-out compensating circuit 5, and these read out sampled data DRO are supplied to a digital to analog converting circuit 7. The sampled data DRO is converted by the digital to analog converting circuit 7 into an analog video signal VDMI according to a clock pulse signal SSM2 synchronized with the read clock pulse PRD, and the signal VDMI is output as an output video signal VDOUT after having added thereto a reference synchronizing signal SYNC1 etc. in a processor 8.

The reference synchronizing signal SYNC1, as well as a synchronizing signal SYNC2 for the read clock generating circuit 6, is generated in a synchronizing signal generating circuit 9 based upon a reference video signal VDREF and a broadcast synchronizing signal SYNCREF.

In the conventional arrangement as shown in FIG. 1, when the phase $\theta$ of the reproduced video signal VDIN deviates as shown in FIG. 2 (A), velocity errors ($\theta$ 1H − $\theta$ 0H), ($\theta$ 2H − $\theta$ 1H), . . . are detected by the write clock generating circuit 3 based on the horizontal synchronizing signal at intervals of its period H at time points t0H, t1H, t2H, . . . The write clock generating circuit 3 supplies the read clock generating circuit 6 with the phase error signal SVE (FIG. 2 (B)) which is formed by assigning, for example, linearly increasing phase error data $\Delta \theta$ 1, $\Delta \theta$ 2, $\Delta \theta$ 3, $\Delta \theta$ 4, . . . to the sampling time points t01, t02, t03, t04, . . . assuming that the velocity error detected at an interval of one H period is, for example, linearly varying during the corresponding one H period.

The read clock generating circuit 6 applies a phase modulation to the read clock pulse PRD in such a way that the generated phases of the read clock pulse PRD are shifted (i.e., advanced or delayed) the phase correction data $\Delta \theta$ 1, $\Delta \theta$ 2, $\Delta \theta$ 3, . . . at the sampling time points t01, t02, t03, . . . within the one H period, and thus the analog video signal VDMI in which the velocity error has been corrected is obtained by reading the sampled data D01, D02, D03, . . . of the reproduced video signal VDIn (FIG. 3 (A)) written in the main memory 1 at the time points which are shifted from the time points in accordance with the predetermined sampling period by the phase correction data $\Delta \theta$ 1, $\Delta \theta$ 2, $\Delta \theta$ 3, . . . as shown in FIG. 3 (B).

However, when the read clock pulse PRD is phase modulated by the phase error signal SVE as in the case of FIG. 1, the velocity error is removed only after the digital DRO has been converted into the analog signal VDMI in the digital to analog converting circuit 7.

On reflection, it may be realized that the sampled data D01, D02, D03, . . . are corrected and become significant when the time points for reading them out are phase modulated. But, if such discrete sampled data were delivered to a digital processing circuit in the rear stage, of the apparatus the data which would have been made free from velocity error by virtue of the phase modulation with the phase error signal SVE would be in effect turned back into the digital sampled signal including the original velocity error by being restored samples at a predetermined period since the digital processing circuit in the rear stage is structured so as to process the sampled data with a specific clock signal having the predetermined period.

Therefore, if it is intended to supply such a discrete digital sampled signal to the digital processing circuit in the rear stage while using the conventional structure as shown in FIG. 1, the video output VDMI of the digital to analog converting circuit 7 must be converted once again into a digital sampled signal by the use of a separate analog to digital converting circuit, which will make the structure larger in scale and more complex and unavoidably invite deterioration in the characteristic of the sampled signal.

OBJECT AND SUMMARY OF THE INVENTION

The present invention was made in view of the above mentioned problems and therefore a primary object of the present invention is the provision of a phase error correcting apparatus capable of giving phase error correcting effect to a discrete sampled signal read out from the main memory while the same is kept as the digital signal.

In accordance with the present invention, in a sampling phase correcting apparatus for correcting the phase of an input sampling signal VDIN having discrete digital data D00, D01, D02, D03, . . . at a predetermined sampling period TS by means of a phase error signal SVE, a first embodiment of the present invention is provided with interpolation data generating means 21 based on digital data VD01, VD02, VD03, . . . of the input sampling signal VDIN for obtaining by interpolating calculation digital data CD01, CD02, CD03, . . . which are shifted in phase by phase amounts corresponding to correction amounts $\Delta \theta$ 1, $\Delta \theta$ 2, $\Delta \theta$ 3, . . . of the phase error signal SVE from the sampling time points t01, t02, t03, . . . to deliver the same as sampled digital data CD01, CD02, CD03, . . . of a corrected output sampled signal DVES.

In a further development of the present invention, a second embodiment is provided with coefficient data generating circuits 27, 41 based on the response of digital data D00, D01, D02, D03, ... of the input signal VDIN for choosing weighting coefficient data (k1, k2), (k11 - k15) corresponding to time points within the sampling period according to the phase error signal DVE and for generating the same at intervals of the sampling period TS, delay circuits 22, 32-35 receiving the digital data D00, D01, D02, D03, ... of the input signal VDIN in succession for delaying the same by its sampling period TS, and arithmetic means (24-25), (36-40, 42) for weighting digital data (D0N, D0(N+1)), (D0N−D0(N+4)) at the input terminal and output terminals of the delay circuits 22, 32-35 by the weighting coefficient data (k1, k2), (k11-k15) generated by the coefficient data generating circuits 27, 41 to deliver the same as phase sampling data DVEC.

DETAILED DESCRIPTION OF THE PREFERRED EMBODIMENTS

An embodiment of the present invention as applied to a velocity error correcting circuit for a VTR will now be described in detail.

Principle of the Correcting Operation

Figure 3:
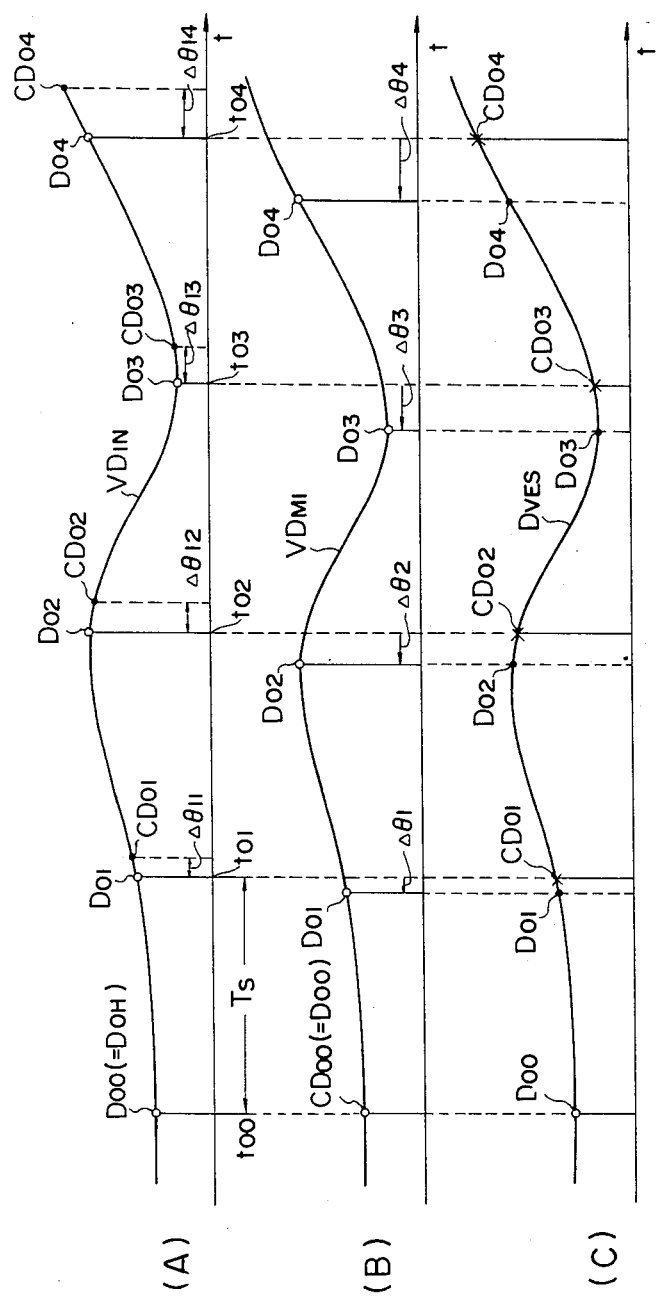
FIG. 3A-C is a signal waveform chart useful for explaining the different operating principles of the present invention and the prior art.

In the present invention, data CD01, CD02, CD03, ... at the time points shifted by the phase amounts $\Delta \theta 11$, $\Delta \theta 12$, $\Delta \theta 13$, ... (FIG. 3 (A)) corresponding to the phase amounts to be corrected (i.e., velocity error amounts) $\Delta \theta 1$, $\Delta \theta 2$, $\Delta \theta 3$, ... (FIG. 3 (B)) are obtained by an interpolating calculation based upon the discrete sampled signals D01, D02, D03, ... forming the video signal VDIN (FIG. 3 (A)) including the velocity error (i.e., phase error). These data CD01, CD02, CD03, ... are used as the discrete sampled data at the sampling time points t01, t02, t03, ... as shown in FIG. 3 (C). In other words, the phase correcting amounts at the sampling time points t01, t02, t03, ... are converted to amplitude values (not phases as shown in FIG. 3 (B)) for making the correction.

By so doing, the sampled signal obtained from the input video signal VDIN with the phase error removed therefrom (corresponding to the sampled signal DVES in FIG. 3 (C)) has sampled data CD01, CD02, CD03, ... at the sampling time points t01, t02, t03, ...

Therefore, there is no adverse influence on the phase correction effect if the sampling signal DVES after the phase correction is subjected to digital data processing with a clock signal at a predetermined period in a digital processing circuit in the rear stage.

In obtaining the interpolation data CD01, CD02, CD03, ... based upon the phase amounts $\Delta \theta 11$, $\Delta \theta 12$, $\Delta \theta 13$, ... corresponding to the phase errors $\Delta \theta 1$, $\Delta \theta 2$, $\Delta \theta 3$, ..., an impulse response satisfying Nyquist's theorem is obtained based on each of the sampled data. The data CD01, CD02, CD03, ... at the phases shifted by the phase amounts $\Delta \theta 11$, $\Delta \theta 12$, $\Delta \theta 13$, ... are interpolated by convolution of each of the sampled data with its impulse response.

In distinction to this, in the prior art, the sampled data of the input video signal VDIN are phase modulated by the amounts $\Delta \theta 1$, $\Delta \theta 2$, $\Delta \theta 3$, ... corresponding to the velocity errors. In the present invention i.e., the phase errors, the phase error amounts $\Delta \theta 1$, $\Delta \theta 2$, $\Delta \theta 3$, ... are used for correction of the amplitude of each of the sampled data, in which lies the difference of the operating principle of the present invention from that of the prior art.

First Embodiment

Figure 1:
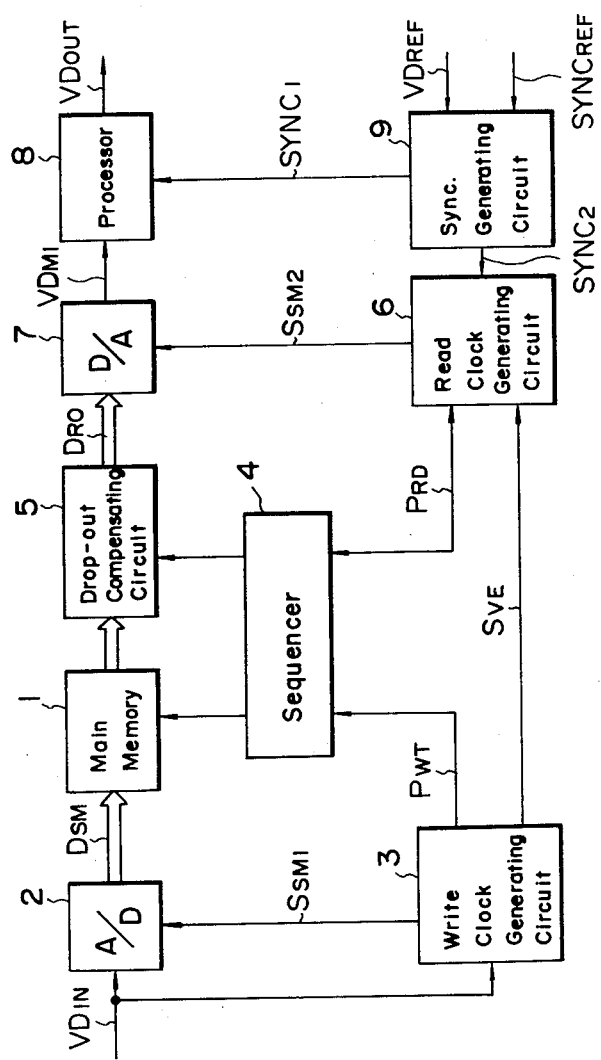
FIGS. 1 and 2A and B are block diagrams of a prior art velocity error correcting circuit and the related signal waveform chart, respectively.
Figure 2:
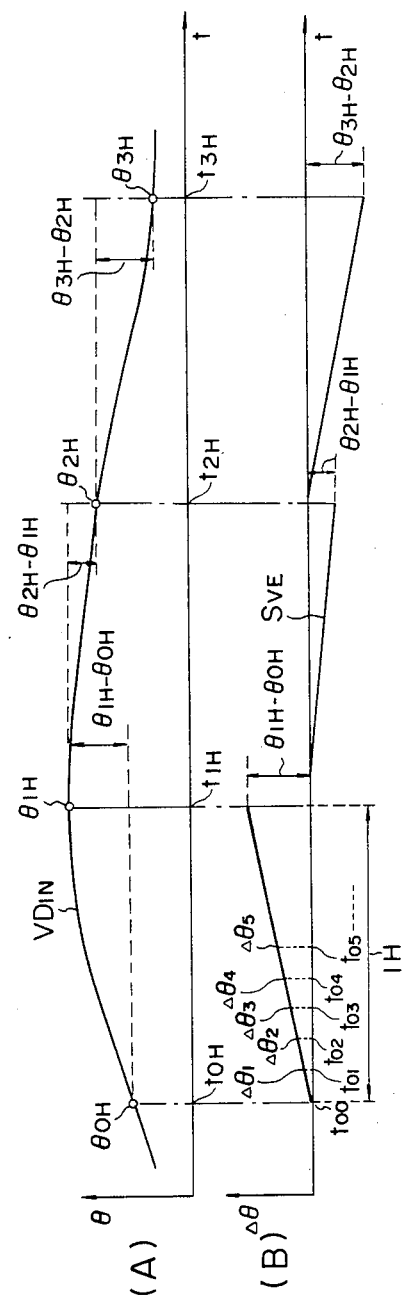
Figure 4:
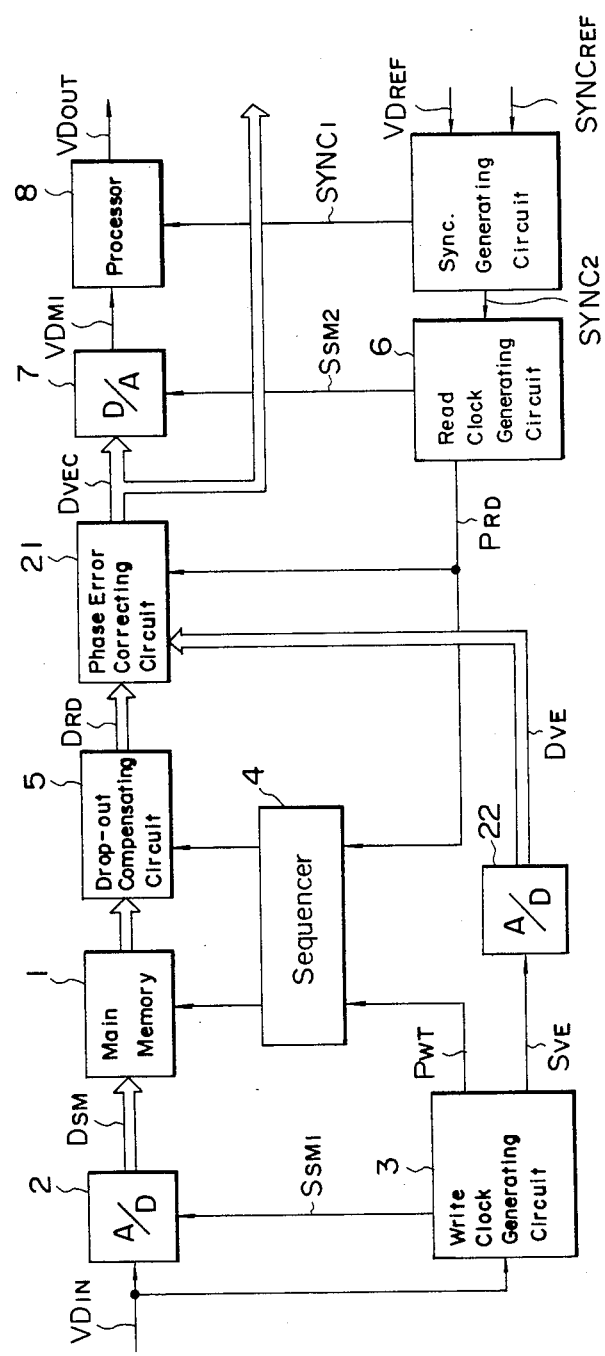
FIG. 4 is a block diagram of an embodiment of a phase error correcting apparatus according to the present invention.

In FIG. 4, in which parts corresponding to those in FIG. 1 are denoted by like reference numerals, a phase error correcting circuit 21 is provided between the drop-out compensating circuit 5 and the digital to analog converting circuit 7. The phase error signal SVE constituting the velocity error signal is converted by an analog to digital converting circuit 22 to the phase error data DVE to be supplied to the phase error correcting circuit 21, and at the same time the read clock pulse PRD generated by the read clock generating circuit 6 is supplied to the phase error correcting circuit 21.

The phase error correcting circuit 21 applies an interpolating calculation to the discrete sampled data DRD successively read out from the main memory 1 to provide interpolation data at time points between the discrete sampled data, with the phase error data DVE controlling the time points at which the interpolation data are produced and the values of the interpolation data. One embodiment of circuit 21 may be structured as shown in FIG. 5.

Figure 5:
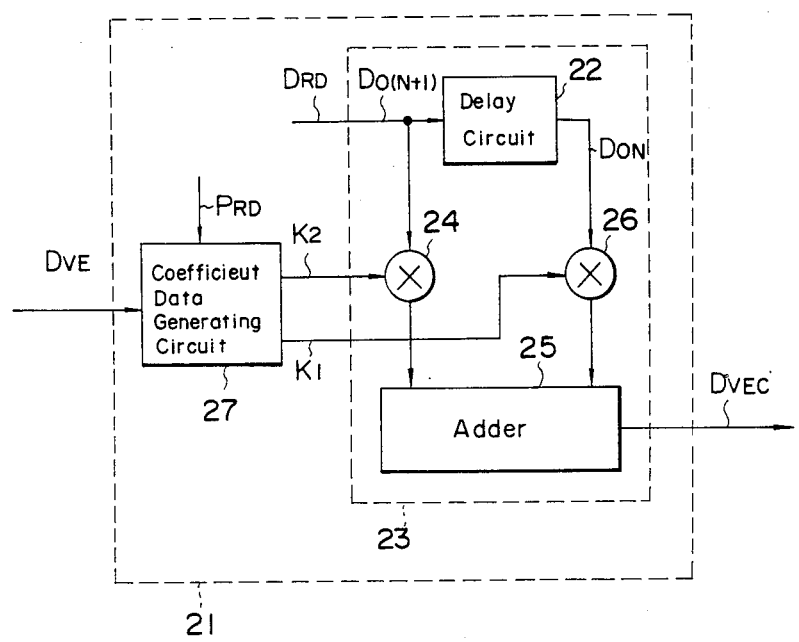
FIG. 5 is a block diagram of a phase error correcting circuit constituting main portion of the apparatus of FIG. 4.

In the embodiment of FIG. 5, the phase error correcting circuit 21 has a digital filter 23 including a delay circuit 22 for delaying the discrete sampled data DRD supplied from the main memory 1 by the sampled period TS. The sampling data D0N sampled at the time point one sampling period TS before and presently obtainable at the output terminal of the delay circuit 22 is supplied to an adder 25 after being multiplied by weighting coefficient data k1 in a multiplier 26. At the same time, the sampled data D0(N+1) obtained at the input terminal of the delay circuit 22 is supplied to the adder 25 after being multiplied by a weighting coefficient data k2 in a multiplier 24. Thus, at the output terminal of the adder 25 are presented phase corrected sampling data DVEC as the output of the digital filter 23 and expressed as $$DVEC = k1\ D0N + k2\ D0(N+1) \tag{1}$$

The weighting coefficients K1 and k2 are previously stored in a coefficient data generating circuit 27 advantageously formed of a ROM as data corresponding to a plurality of values on an impulse response curve and read out with the phase error data DVE at the timing of the read clock pulse PRD.

When, as described above with reference to FIG. 3 (A), the analog to digital converting circuit 2 samples the reproduced video signal VDIN having a restricted band with the sampling clock SSM1 at the time points t00, t01, t02, t03, . . . , the sampled data D0H, D01, D02, D03, . . . (FIG. 6 (A)) are sampled at the period TS satisfying Nyquist's theorem, and therefore, by the use of a filter having frequency characteristic as shown in FIG. 6 (B), the values of amplitude between the discrete sampled data D0H, D01, D02, D03, . . . can be reproduced as values corresponding to the impulse response curve as shown in FIG. 6 (C).

Figure 6:
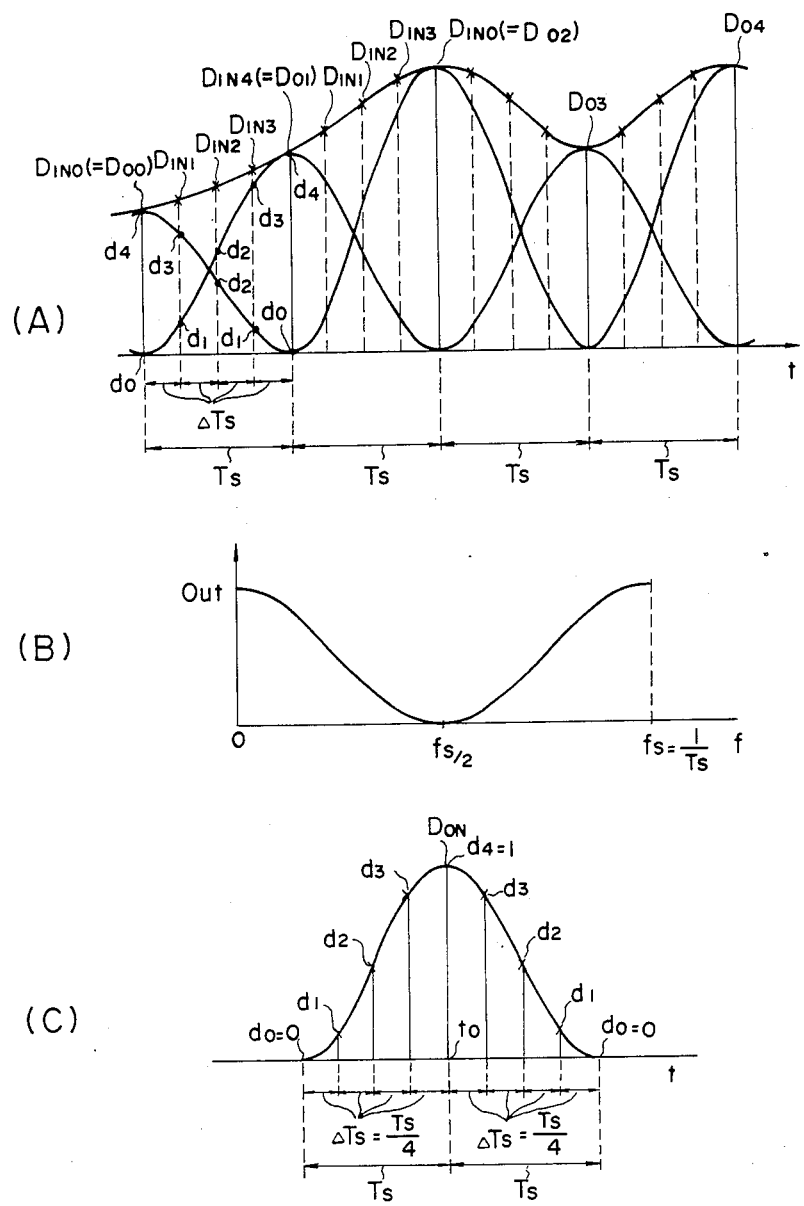
FIGS. 6A-C and 7A and B are schematic characteristic curves useful for explaining the interpolating operations performed in the circuit of FIG. 5.

That is, when an impulse formed of the datum D0N, for example, is applied to the filter having the frequency characteristic as shown in FIG. 6 (B), the impulse response obtained as an output is shown in FIG. 6 (C) has having an amplitude characteristic, within the range of ±Ts (Ts is the sampling period) with the data D0N at the time point t0 in the center, with a maximum amplitude value D0N at the time point t0 and decreasing in amplitude symmetrically about the time point T0 in the center, to zero at the time points corresponding to the time widths +ts and ts.

Therefore, when the sampled signal formed of the discrete sampled data D00, D01, D02, D03, . . . as shown in FIG. 6 (A) is applied to the filter 23 having the frequency characteristic as shown in FIG. 6 (B), an output signal having amplitude values in which the data D00, D01, D02, D03, . . . and the impulse response thereto are convolved is obtained at the output terminal of the filter 23. This means, as shown in FIG. 6 (A), that the amplitude values between the data D00 and D01, D01 and D02, D02 and D03, . . . provide the result, showing changes in amplitude equivalent to the averaged values of the impulse response waveforms of adjoining data.

Figure 7:
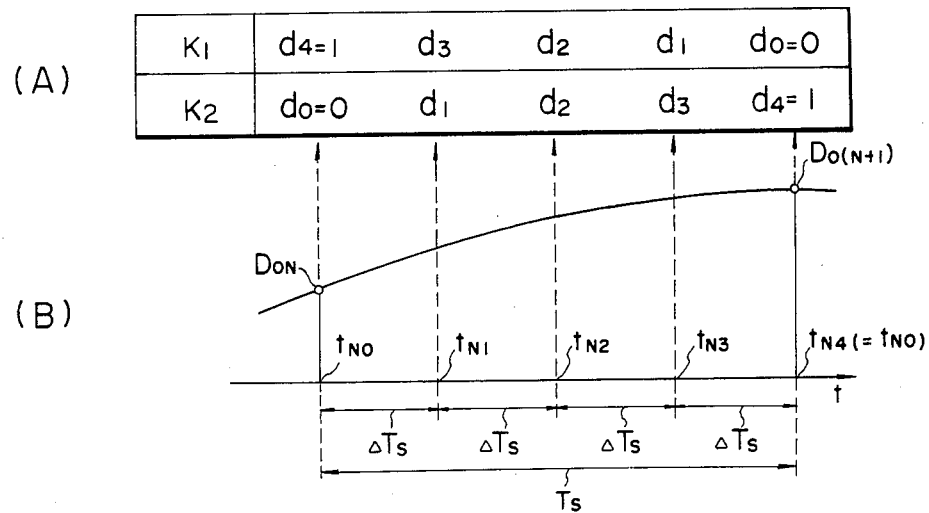

Therefore, as shown in FIG. 7 (A) and FIGS. 7 (B), the intervals in between the data D00, D01, D02, D03, . . . are divided into a specific number, h, of interpolation intervals Δ Ts (Δ Ts=Ts /h, h=4, in the present example), and the values d0, d1, d2, d3, and d4 (=d0), of the impulse response at each of the dividing time points tN0, tN1, tN2, tN3, and tN4, have the corresponding values between d0=0 to d4=1, and these values are arranged to be stored in advance in the coefficient data generating circuit 27 (FIG. 5) as weighting coefficients k1 and k2. Thus, the sampling data D0N and D0(N+1) are multiplied by weighting coefficients k1 and k2 corresponding to the data D0N and D0(N+1) at the timing of the time points tN0, tN1, tN2, tN3, and tN4 (=tN0) (FIG. 7 (B)) in between the data D0N and D0(N+1). From the calculation of their total sum $$DINj = k1 D0N + k2 D0(N+1) \quad (2)$$

(j=0, 1, 2, 3, 4), the interpolation data DINj are obtained. Here, the weighting coefficients k1 and k2 are chosen as (FIG. 7 (A))

$$k1 = d(4-j) \quad (j=0, 1, 2, 3, 4) \quad (3)$$

$$k2 = dj \quad (j=0, 1, 2, 3, 4) \quad (4)$$

Referring to FIG. 7 (A), since the impulse response waveform (FIG. 6 (C)) is symmetric, the weighting coefficient k1 for the data D0N is d4, d3, d2, d1, and d0, whereas the weighting coefficient k2 for the data D0(N+1) is d0, d1, d2, d3, and d4, at the time points tN0, tN1, tN2, tN3, and tN4.

Therefore, the data delivered from the filter 23 at the time points tN0, tN1, tN2, tN3, and tN4 in between the data D00 and D01, for example, are, as indicated in FIG. 6 (A), expressed by $$DIN0 = d4 \, D00 + d0 \, D01$$
$$= D00 \quad (5)$$
$$DIN1 = d3 \, D00 + d1 \, D01 \quad (6)$$
$$DIN2 = d2 \, D00 + d2 \, D01 \quad (7)$$
$$DIN3 = d1 \, D00 + d3 \, D01 \quad (8)$$
$$DIN4 \, (= DIN0) = d0 \, D00 + d4 \, D01$$
$$= D01 \quad (9)$$

Thus, as described above with reference to FIG. 3 (A), if the discrete sampled data D00, D01, D02, . . . are put into the digital filter 23 at the sampling timing t00, t01, t02, . . . , and if the phases of the sampled data D01, D02, D03, . . . must be corrected by Δθ1, Δθ2, Δθ3, . . . as described above with reference to FIG. 3 (B), then by choosing the weighting coefficients k1 and k2 (FIG. 7) that are assigned to the time points tN0, tN1, tN2, tN3, and tN4 which are shifted from the sampling points t01, t02, t03, . . . of the input video signal VDIN by Δθ11, Δθ12, Δθ13, . . . corresponding to the correction amounts Δθ1, Δθ2, Δθ3, . . . and reading out the same from the coefficient data generating circuit 27, the phase corrected sampled data DVEC can be output free from the phase error.

Besides, since the phase corrected sampled data DVEC has its amplitude corrected with the phase error data DVE at the sampling timing t00, t01, t02, t03, . . . , the same can have discrete data at the sampling timing t00, t01, t02, t03, . . . Therefore, if the phase error corrected sampled data DVEC is delivered unchanged to the digital processing circuit in the rear stage to be subjected to data processing therein with its specific clock pulse, the data can be processed without the possibility of an adverse influence on the correction effect of the phase error.

To achieve this, according to the embodiment of FIG. 5, the clock pulse used therein must be one having the period of the read clock pulse PRD, that is, the sampling period TS. Only by using the same can the interpolating calculation within the sampling period TS be carried out, and thus, the interpolating calculation can be executed without the need for a clock pulse of a higher frequency.

Second Embodiment

Figure 9:
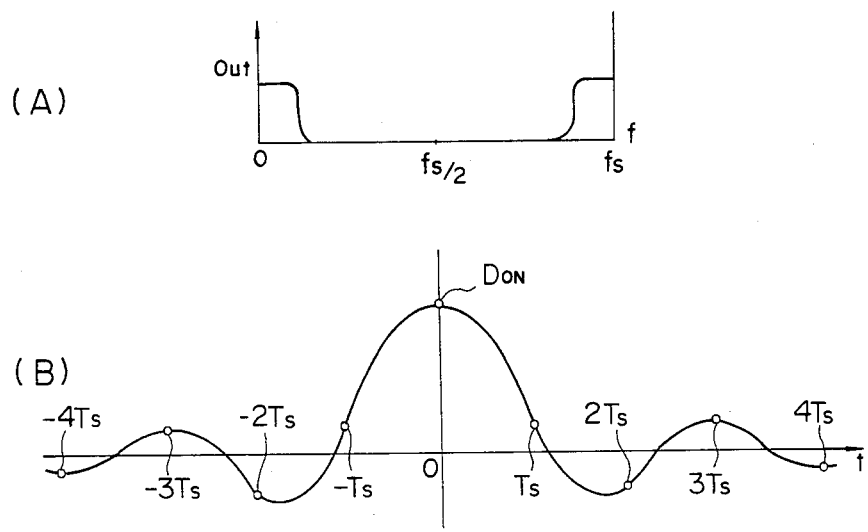
FIGS. 8 and 9A and B are block diagrams of a second embodiment of the present invention and the related characteristic curves, respectively.
Figure 8:
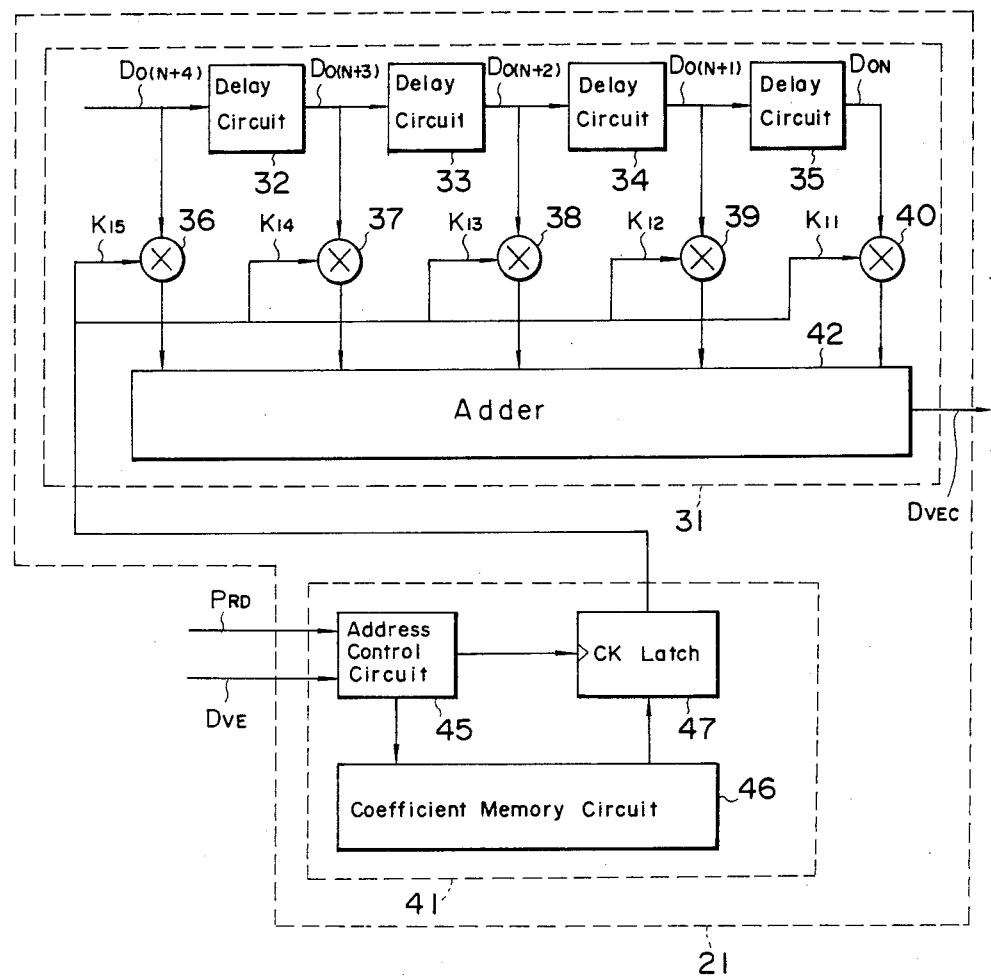

FIG. 8 shows a second embodiment of the present invention, in which a digital filter 31 having a frequency characteristic with a relatively wide frequency band as shown in FIG. 9 (A) is provided for processing a digital video signal of which the frequency band is restricted, for example, to 4 to 5 M Hz. In a filter having such a wide band frequency characteristic, the impulse response for the sampling period TS corresponding to the Nyquist period is produced extending over the range of ±4TS as shown in FIG. 9 (B).

Therefore, the amplitude value of the phase corrected sampled data DVEC delivered from digital filter 31 at any time point according to the impulse response produced based upon the successive sampled data has a value equal to the total sum of the values obtained from adjoining sampled data by an interpolating calculation expressed as $$DVEC = k11D0N + k12D0(N+1) + k13D0(N+2) + k14D0(N+3) + k15D0(N+4) \quad (10)$$

In order to make such an interpolating calculation, the digital filter 31 (FIG. 8) includes four delay circuits 32, 33, 34, and 35, each having a delay time equal to the sampling period TS, successively connected in series such that the sampled data D0(N+4), D0(N+3), D0(N+2), D0(N+1), and D0N at the input and output terminals of the delay circuits 32, 33, 34, and 35 are multiplied by coefficient data k15, k14, k13, k12, and k11 delivered from a coefficient data generating circuit 41 through respective multipliers 36, 37, 38, 39, and 40. All the products are put into an adder 42, and the added output is delivered as the phase corrected sampling data DVEC.

The coefficient data generating circuit 41 is arranged so as to receive the phase error data DVE at its address control circuit 45 and to read out the coefficient data k15−k11 from a coefficient memory circuit 46 advantageously formed a ROM to deliver the same through a latch circuit 47 to the multipliers 36–40.

By so doing, in the same way as in the first described embodiment of FIG. 5, the video data at the phase position represented by the phase correction amount of the phase error data DVE can be obtained by an interpolating calculation based on the discrete sampling data in the vicinity, and the same can be delivered as the phase corrected sampling data DVEC at the time point when the read clock pulse PRD comes in.

Therefore, in the embodiment of FIG. 8, discrete sampling data with the phase error removed therefrom can be obtained at the time point when the read clock pulse PRD comes in, and thus, the same effect as described above with reference to FIG. 5 can be obtained.

Other Embodiments

Although the present invention as applied to a velocity error correcting circuit has been described in the above description of the embodiments, the present invention is not limited to that application but is widely applicable, for example, to controlling the hue or controlling the sampling phase of a reproduced video signal.

Furthermore, although the interval between the data of the sampling signal before correction was divided into four periods Δ TS for the interpolating calculation of the data corresponding to the phase error in the above described embodiments, the number of divisions can be increased or decreased as required, and thus the accuracy of the phase control can be improved according to the need.

According to the present invention as described above, in controlling the phase of a sampling signal formed of discrete digital data, data of the sampling pulse at its produced time point is obtained from each of the data of the sampled signal before correction by an interpolating calculation and the same is delivered as a sampled signal after correction, and therefore, the so obtained sampled signal after correction as is can be subjected to digital processing in a digital processing circuit in the rear stage with a clock pulse at a predetermined period.

By virtue of the described arrangement according to the present invention, a clock at only the sampling period is required for the interpolating calculation and it is not necessary to use a higher frequency.

What is claimed is:

1. An apparatus for correcting a phase error of digital data with a predetermined clock rate comprising:
   signal source means for generating an analog signal;
   digital data generating means supplied with said analog signal for generating said digital data, said digital data generating means including analog to digital converting means for converting the analog signal to the digital data occurring at original sampling timings established at said predetermined clock rate and further including memory means, write clock generating means for generating a write clock signal supplied to said memory means, and read clock generating means for generating a read clock signal supplied to said memory means, said write clock signal being controlled by time base error information of said analog signal, and said read clock signal having a predetermined frequency and phase determined by a reference signal, whereby the digital data read out from said memory means is provided at a predetermined clock rate determined by said read clock signal;
   phase error detecting means for detecting a phase error of the digital data and for generating a phase error signal; and
   correcting means supplied with the digital data from said digital data generating means and the phase error signal from said phase error detecting means for correcting the phase error of the digital data; wherein:
   said correcting means includes interpolating means for determining by interpolation a value of a digital datum at a timing apart from a corresponding one of said original sampling timings of said digital datum by a duration determined by said phase error signal and for producing the interpolated value of said digital datum at said corresponding original sampling timing of said digital datum;
   said interpolating means includes coefficient data generating means controlled by said read clock signal and the phase error signal for generating coefficient data, digital filter means having at least one delay means supplied with said digital data for delaying the digital data for one clock period associated with said predetermined clock rate, multiplying means for multiplying said coefficient data and the digital data input to and output from said delay means respectively to provide multiplied outputs, and adding means for adding the outputs of said multiplying means; and
   said coefficient data generating means includes read only memory means storing plural coefficient data, address signal generating means controlled by said phase error signal for generating an address signal supplied to said read only memory means so that the coefficient data at the address designated by said address signal is read out, and a latch means for latching the data read out of the read only memory means.

2. A phase error correcting apparatus according to claim 1, wherein said analog signal is a video signal reproduced from a video signal reproducing device.

3. A phase error correcting apparatus according to claim 1, wherein said phase error detecting means detects a phase error of said analog signal.

* * * * *